Patented Apr. 28, 1953

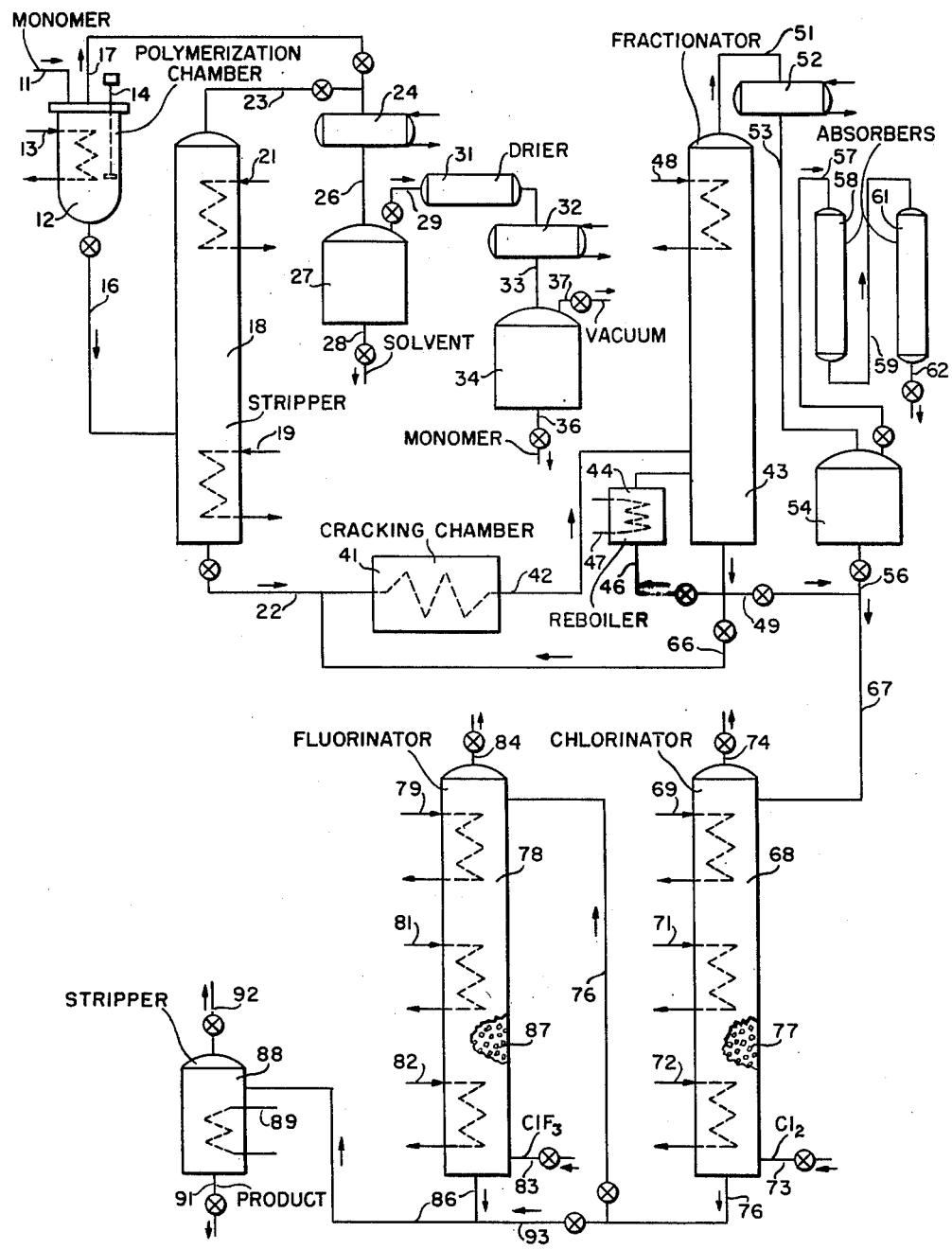

2,636,908

UNITED STATES PATENT OFFICE 2,636,908

MANUFACTURE OF HALOCARBONS

Albert L. Dittman, Jersey City, and John M. Wrightson, North Bergen, N. J., assignors to The M. W. Kellogg Company, Jersey City, N. J., a corporation of Delaware Application June 10, 1949, Serial No. 98,276

5 Claims. (Cl. 260—653)

This invention relates to the manufacture of halocarbons. In one of its aspects this invention relates to the manufacture of halocarbon oils of intermediate boiling range. In another aspect this invention relates to the halogenation of halocarbon oils. In one of its more particular aspects this invention relates to a process for the polymerization of perfluoro-olefins and perfluorochloro-olefins to produce halocarbon oils, greases and waxes and the subsequent cracking of these materials to produce oils of lower molecular weight and boiling range followed by halogenation of the cracked product to stabilize same.

Normally liquid halocarbon oils may be produced directly by the polymerization of perhalo-olefins under appropriate conditions. However, this method of preparing halocarbon oils results in a product of relatively wide boiling range and a relatively low yield of oils within an intermediate boiling range. Moreover, the oils are somewhat unstable due to unsaturation and the presence of small amounts of hydrogen and catalytic fragments and must be subsequently halogenated for optimum chemical and physical properties.

It is an object of this invention to provide a continuous process for the production of halocarbon oils within an intermediate boiling range in high yields.

Another object of this invention is to provide a method for increasing the chemical and physical stability of cracked halocarbon oils.

A further object is to provide a method of halogenating unsaturated halocarbon oils.

Another object is to provide a method for the production of a stabilized polytrifluorochloroethylene oil of an intermediate boiling range by a more economical method than heretofore employed.

Various other objects and advantages of the present invention will become apparent to those skilled in the art from the accompanying description and disclosure.

As herein employed, halocarbons are defined as compounds consisting substantially exclusively of carbon and halogen with any degree of saturation and containing only negligible amounts of other elements such as hydrogen and oxygen in a quantity less than about 2 weight per cent. These other elements are derived from materials utilized in the process, as will hereinafter become apparent. Perfluoro-olefin is defined as a perhalo-olefin with any degree of unsaturation consisting of fluorine and carbon, and a perfluorochloro-olefin is defined as a perhalo-olefin consisting of fluorine, chlorine and carbon. The perfluorochloroolefins of this invention are those containing not more than one chlorine atom per atom of carbon.

In accordance with this invention a perfluoro-olefin or a perfluorochloro-olefin, such as trifluorochloroethylene, tetrafluoroethylene, perfluorobutadiene, difluorodichloroethylene including both $CF_2=CCl_2$ and $CFCl=CFCl$, perfluoropropene, perfluoromonochloropropene, perfluorobutene, perfluoromonochlorobutene, etc., is polymerized under conditions such that oils and greases at normal atmospheric temperatures and waxes, including hard waxes having softening points extending up to about 200° C. are produced. The product of the polymerization is separated from unreacted monomer and may be separated into fractions, such as oils, greases and waxes, and the polymerization products thus separated, either singly or in combination, are pyrolyzed or cracked under appropriate conditions to split the carbon-carbon bonds whereby a halocarbon oil of lower boiling range and of lower molecular weight than the aforesaid polymerization product is produced. The cracked halocarbon oil is separated from lower boiling perhalocarbons and may be further separated into particular fractions. Halocarbon fractions thus produced are halogenated singly or in combination with each other to produce a normally liquid oil of relatively narrow boiling range having optimum chemical and physical characteristics. The halogenation treatment involves the addition of chlorine and/or replacement of hydrogen and catalytic fragments with chlorine, with or without a subsequent fluorination treatment of similar nature. The oils produced by the process of this invention are stable and generally boil within the range of about 100° C. to about 250° C. at 1 to 2 mm. of mercury pressure and include some high molecular weight residues. However, oils of narrower, wider or different boiling ranges may be produced by this invention without departing from the scope thereof. The boiling range of the oil product will depend upon such factors as the composition of the charging stock, conditions of polymerization and cracking, and various other factors, as will become apparent from the following description and disclosure.

Any one of several methods may be employed to obtain the halocarbon oils to be stabilized by halogenation. We prefer to obtain these oils by first polymerizing a suitable monomer in the presence of a promoter and chain transfer solvent to produce a relatively heavy polymer and subsequently cracking the polymer to produce a lighter fraction which is then halogenated. The polymerization step may be practiced by various methods. For example, the monomer may be polymerized in a batch manner in a reaction bomb for a sufficient length of time until the desired degree of polymerization has been effected. Another method utilizes the use of a diluent or heat transfer medium such as water in the presence of which the monomer is polymerized in admixture. The cracking step may also be effected in a continuous or batch manner. The various methods of polymerization and cracking will be discussed in conjunction with the discussion of the drawing as applied to the production of polytrifluorochloroethylene oils.

For a better understanding of the present invention, reference will be made to the accompanying drawing which diagrammatically illustrates in elevation an arrangement of apparatus partly in cross section for the production of intermediate boiling halocarbon oils from the monomer, trifluorochloroethylene. However, it is to be understood that the integrated process as illustrated in the drawing may be applied to the production of intermediate boiling halocarbon oils from other monomers and perhalo-olefins, as previously mentioned. The principal pieces of apparatus of the present invention comprise a polymerization chamber 12, a cracking chamber 41, a chlorinator 68, a fluorinator 78 and various purification and separation equipment for purification and separation equipment for purifying and separating materials utilized and produced.

The monomer, trifluorochloroethylene, may be prepared in various ways depending upon the availability of the raw material and the desired purity of the product. One method of preparing the monomer which is frequently employed is the dechlorination of trichlorotrifluoroethane (Freon 113) in the presence of zinc dust. Another method which we propose is a method which employs acetylene as the raw material. Several reaction routes may be used when starting with acetylene to produce trifluorochloroethylene. One of these reaction routes constitutes the reaction of acetylene with hydrogen fluoride at atmospheric pressure and at a temperature between about 0° C. and about 150° C. to produce vinyl fluoride according to the following equation:

$$CH \equiv CH + HF \xrightarrow{(HgCl_2)} CH_2 = CHF \quad (1)$$

The vinyl fluoride thus produced is chlorinated at atmospheric conditions to produce dichlorofluoroethane according to equation 2:

$$CH_2 = CHF + Cl_2 \rightarrow CH_2Cl - CHClF \quad (2)$$

The dichlorofluoroethane is further chlorinated according to equation 3 such that chlorine is substituted for hydrogen on the carbon atom adjacent to the one containing fluorine to produce tetrachlorofluoroethane.

$$CH_2Cl - CHClF + 2Cl_2 \rightarrow CCl_3CHClF + 2HCl \quad (3)$$

The reaction of Equation 3 requires somewhat more severe conditions than employed in the reaction of Equation 2. In general, the reaction of Equation 3 is effected in the presence of a catalyst, such as sunlight or ultra-violet light, at a temperature between about 0° C. and about 100° C. The reactions of Equations 2 and 3 may be effected simultaneously in the same reactor if desired. The tetrachlorofluoroethane produced by the reaction of Equation 3 is reacted with hydrogen fluoride in the presence of a conventional catalyst, such as an antimony salt, at a temperature between about 50 and about 200° C. at atmospheric pressure or higher, in accordance with the reaction illustrated in Equation 4, to produce trifluorodichloroethane.

$$CCl_3CHClF + 2HF \xrightarrow{Sb^V} CClF_2CHClF + 2HCl \quad (4)$$

The trifluorodichloroethane is then dehydochlorinated with a caustic solution, such as sodium or potassium hydroxide, at a slightly elevated temperature in accordance with Equation 5 to produce the monomer, trifluorochloroethylene.

$$CClF_2CHClF + NaOH \rightarrow CF_2 = CClF + NaCl + H_2O \quad (5)$$

Another method for preparing the monomer from acetylene is by the chlorination of acetylene at a temperature between about 0° C. and about 50° C. and atmospheric pressure in the absence of light to produce dichloroethylene in accordance with typical Equation 6.

$$CH \equiv CH + Cl_2 \rightarrow CHCl = CHCl \quad (6)$$

Thereafter, the dichloroethylene is reacted with anhydrous hydrofluoric acid at a temperature between about 0° C. and about 150° C. at pressures of 10 to 100 atmospheres to produce dichlorofluoroethane in accordance with Equation 7.

$$CHCl = CHCl + HF \rightarrow CH_2Cl - CHClF \quad (7)$$

The subsequent reactions involved are the same as those illustrated by Equations 3, 4 and 5 to produce trifluorochloroethylene.

Still another method for providing trifluorochloroethylene from acetylene is by the chlorination of acetylene to produce symtetrachloroethane in accordance with Equation 8, which reaction is effected at a temperature below about 100° C. for a sufficient length of time and with a stiochiometric excess of chlorine to produce the saturated compound tetrachloroethane.

$$CH \equiv CH + 2Cl_2 \rightarrow CHCl_2 - CHCl_2 \quad (8)$$

The tetrachloroethane is then fluorinated with anhydrous hydrofluoric acid in the presence of a conventional catalyst, such as antimony or mercury salts, in accordance with Equation 9 to produce difluorodichloroethane.

$$CHCl_2 - CHCl_2 + 2HF \xrightarrow[HgO]{Sb^V \text{ or}} CHF_2 - CHCl_2 + 2HCl \quad (9)$$

The difluorodichloroethane thus produced is chlorinated at a temperature between about 50 and about 200° C. in the presence of a conventional catalyst or promoter, such as sunlight or ultraviolet light, to produce trichlorodifluoroethane in accordance with the reaction illustrated in Equation 10.

$$CH_2 - CHCl_2 + Cl_2 \rightarrow CHF_2 - CCl_3 + HCl \quad (10)$$

The trichlorodifluoroethane thus produced in accordance with the reaction of Equation 10 is then fluorinated with anhydrous hydrogen fluoride at a temperature of 50° C. to 150° C. in the presence of a conventional catalyst, such as an antimony salt, to produce trifluorodichloroethane in accordance with the reaction illustrated in Equation 11.

$$CHF_2CCl_3 + HF \xrightarrow{SbCl_5} CHF_2CCl_2F + HCl \quad (11)$$

The trifluorodichloroethane produced by the reaction of Equation 11 is then dechlorinated to trifluorochloroethylene by treatment with a caustic solution in accordance with the reaction illustrated in Equation 12.

(12)
$CHF_2-CCl_2F + NaOH \rightarrow CF_2=CClF + NaCl + H_2O$

Two other methods of producing the monomer are disclosed in our prior and copending applications 53,722 and 53,723, filed October 9, 1948.

According to the drawing and the process illustrated, the monomer trifluorochloroethylene is introduced through conduit 11 into polymerization chamber 12. The monomer may be introduced continuously or intermittently into chamber 12. Element 13 represents a conventional heating or cooling means for maintaining polymerization chamber 12 at the desired temperature level. Numeral 14 designates a conventional stirrer for maintaining the contents of chamber 12 in an agitated condition during polymerization.

Polymerization is effected under liquid phase conditions by employing a sufficiently high pressure at the temperature of polymerization. The temperature of polymerization will depend upon such factors as the particular promoter and chain transfer solvent employed if any and the molecular weight and boiling range of the product to be produced. For the polymerization of trifluorochloroethylene, a suitable polymerization temperature will lie within the range of about 0° C. to about 300° C., preferably between about 70° C. and about 200° C. A suitable residence time is allowed for completing the desired reaction and obtaining the desired product. The residence time will range from a matter of seconds to as much as one hundred hours, preferably between about 1 minute and about 10 hours. Excess pressures over that necessary to obtain liquid phase operations may also be used, such pressures ranging as high as 15,000 to 30,000 pounds per square inch gage.

The polymerization of trifluorochloroethylene to produce oils, greases and waxes can be effected by various methods. In most instances the polymerization is effected in the presence of a suitable promoter and a chain transfer solvent. The type of promoters and chain transfer solvents employed will depend upon such factors as the temperatures and pressures employed and the manner in which the reaction is carried out, e. g., suspension technique in a liquid, such as water, or a batch process with or without a diluent.

Promoters which may be employed comprise organic and inorganic peroxides and free oxygen. Examples of suitable organic promoters include acyl peroxides such as acetyl peroxide, monochloro, dichloro and trichloroacetyl peroxides, fluoroacetyl peroxides, chloroacetyl peroxides, benzoyl peroxide, p-bromobenzoyl peroxide, bistrifluorodichloropropionyl peroxide, bis-difluorochloroacetyl peroxide, dichlorofluoroacetyl peroxide, diethyl peroxide and dichlorofluoroacetyl peroxide. The weight ratio of promoter to monomer charged is between about 1:10 to about 1:200, generally being between about 1:15 to 1:50. Increasing the amount of promoter decreases the molecular weight of the resulting product.

The inorganic promoters are generally employed in conjunction with the suspension technique polymerization in which the monomer is admixed with a liquid, such as water. Since the inorganic promoters are usually soluble in the diluent or suspension medium, they are preferred when employing the suspension polymerization technique, and in the case of water as the suspension medium the inorganic perborates are preferred because of their solubility. For a more detailed discussion of the inorganic promoters which may be employed when polymerizing in the presence of water, reference may be had to our prior and copending application 61,082, filed November 19, 1948. This application may also be referred to for other related material such as, in particular, the suspension polymerization technique.

Suitable chain transfer solvents include chloroform, carbon tetrachloride, trichlorotrifluoroethane, 1,2,2-tetrachloroethane, tetrachloroethylene, 1,2-dichloroperfluoro cyclobutane and trichloroethylene and halogenated aliphatic compounds in general. The weight ratio of solvent to monomer charged is usually between about 10:1 to about 1:5 and increased amounts of solvents result in lower molecular weight products of the polymerization. In the process illustrated in the drawing, chloroform is employed as the chain transfer solvent.

Thermal polymerization may be employed without the use of promoters and/or chain transfer solvents but generally with small amounts of free oxygen to obtain an oil product. For thermal polymerization, relatively higher temperatures and pressures are necessary.

The product produced by the polymerization by any of the above methods has a boiling range between about 50 and about 350° C. at 1–2 mm. of mercury pressure, but the exact boiling range will depend upon the various operating conditions and promoter and solvent employed. The waxes produced by the polymerization under the conditions of this invention, including hard waxes, have softening points as high as 200° C. A portion of the product will usually consist of both waxes and greases; that portion may be between about 10 and about 50 per cent by volume of the total product. Conversion as high as 50 per cent of monomer charged, or better, is possible under optimum conditions of operation.

Polymerization products are withdrawn from chamber 12, continuously or intermittently, through conduit 16 and passed to a stripper 18. In intermittent operations, normally gaseous components of reaction chamber 12 are withdrawn therefrom through conduit 17. In stripper 18 unreacted monomer, chloroform, promoter residue, water if used as a diluent, and relatively low boiling halocarbons are stripped from the polymerization products. Numeral 19 designates a conventional heating or cooling means for obtaining the desired bottoms temperature in stripper 18. For atmospheric pressure operations, the bottoms temperature of stripper 18 when polymerizing trifluorochloroethylene is usually maintained above room temperature, usually about 90 to 110° C. Numeral 21 designates a conventional cooling or heating means for maintaining the temperature of the top of stripper 18 at the desired value. If desired, heat exchanger means 21 may be omitted. The top temperature of stripper 18 is maintained usually at a temperature lower than the bottom temperature and preferably, when polymerizing trifluorochloroethylene, at a temperature about 65° C. or above at atmospheric pressure, depending upon the desired materials to be passed overhead from stripper 18. Stripper 18 may include suitable packing or baffle plates therein to obtain efficient operation. In general, higher stripping temperatures are employed with super-atmospheric pressure operations.

When water is used as the reaction medium or diluent in the suspension polymerization technique, a settler (not shown) is included on conduit 16 to make a phase separation between water and halocarbon oils. The oils will still retain some water and this water may be removed with the overhead from stripper 18.

The overhead product comprising unreacted monomer and the solvent chloroform is withdrawn from stripper 18 through conduit 23 and combined with any gaseous materials in conduit 17 and passed to condenser 24 which is maintained at a sufficiently low temperature to condense substantially all of the chain transfer solvent. In the case of chloroform as the chain transfer solvent, condenser 24 is maintained at a temperature of about 60° C. or lower. Condensate and uncondensed vapors are passed from condenser 24 to accumulator 27 through conduit 26.

Condensate comprising the chain transfer solvent is removed from accumulator 27 through conduit 28 and is recycled by means not shown to polymerization chamber 12. Uncondensed vapors comprising the monomer trifluorochloroethylene are removed from condenser 27 and passed through conduit 29 to a drier 31 which is used only when water is not employed as a diluent. Drier 31 contains phosphorous pentaoxide or silica gel, or both, for the removal of hydroxy compounds from the monomer. The dried monomer vapors are passed from drier 31 to condenser 32 where the vapors are cooled to a temperature sufficiently low to condense the monomer at the prevailing pressure. Condensed monomer and any uncondensed vapors are passed from condenser 32 through conduit 33 to an accumulator 34. Condensate is removed from accumulater 34 by means of conduit 36 and is recycled by means not shown to polymerization chamber 12. Uncondensed vapors are removed from accumulator 34 through conduit 37 by means of a partial vacuum.

The crude halocarbon oils separated in stripper 18 substantially free from chain transfer solvent and promoter residue are removed from the bottom thereof by means of conduit 22 and are passed to a cracking chamber 41 where the oils are cracked to a product of lower boiling point and lower molecular weight. The crude halocarbon oils are passed through stainless steel coils immersed in a lead bath maintained at a temperature between about 330 and about 400° C., preferably between about 350° C. and about 375° C., at which temperature the polytrifluorochloroethylene oils and waxes are cracked. The cracking feed may be introduced in either the vapor or liquid phase depending on the composition and character thereof, as desired. Higher temperatures, such as 600° C., may be used for cracking without departing from the scope of this invention. At the preferred temperature range the residence time of the oil in the cracking coils of chamber 41 will generally be between about 10 seconds and about 2 hours, depending upon the degree of cracking desired, type of apparatus and manner of operation. Cracking of the crude halocarbon oils and waxes to intermediate oil increases the yield of oil in the intermediate boiling range in some instances as much as 50 per cent or more over that which could be obtained by direct polymerization.

It may be preferred to effect the cracking or pyrolysis of the halocarbon oils in the presence of free chlorine. Cracking in the presence of chlorine produces a somewhat more stable oil than can be obtained without the presence of chlorine and minimizes the amount of halogen required in the subsequent stabilization treatment. Usually the free chlorine is introduced with the halocarbon to be cracked into the reaction or cracking zone and antimony pentachloride is also introduced or is present in the reaction zone. The chlorination of the halocarbon oils during cracking results in three types of end groups as illustrated by Equation 13 below:

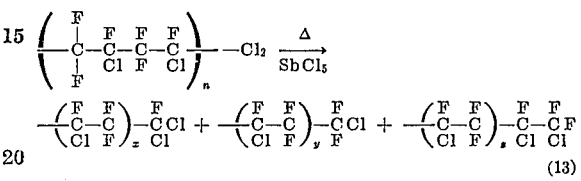

(13)

Under optimum conditions of pyrolysis in the presence of chlorine, stabilization of the oil may be unnecessary and may thus be eliminated entirely if desired. Whether or not the oil must be ultimately stabilized will depend upon its use, because even with cracking in the presence of chlorine the oil is not completely stable but may be sufficiently stable for certain purposes. Usually about one to ten parts of free chlorine are employed per hundred parts by weight of halocarbon oils charged to the cracking zone. Various quantities of chlorine, however, may be employed other than the above without departing from the scope of this invention and the exact amount can be determined by one skilled in the art by trial without difficulty.

The vaporous cracking effluent is removed from cracking chamber 41 and is cooled and condensed by means not shown. The condensed cracked fraction is passed through conduit 42 to fractionator 47, into which it is introduced at an intermediate point. A reboiler 44 is employed to maintain the desired bottom temperature of fractionator 43. A portion of the liquid bottoms product is circulated through conduit 46 and reboiler 44 and returned to fractionator 43. Element 47 is a conventional heat exchanger for maintaining the desired temperature of the reboiler which is generally between about 200 and about 350° C. at a pressure about 1–2 mm. of mercury. The bottoms product comprising halocarbon oils boiling above about 250 to 350° C. is removed from fractionator 43 by means of outlet conduit 49. All or a portion of the bottoms product from fractionator 43 may be recycled to cracking chamber 41 by means of conduit 66.

Numeral 48 designates a cooling coil in the upper portion of fractionator 43 for maintaining the top temperature of the fractionator at the desired level, preferably between about 100 and about 300° C. at the aforesaid pressure. An overhead vaporous fraction comprising relatively low boiling halocarbon oils and small quantities of monomer, hydrogen fluoride, hydrogen chloride, etc., is removed from fractionator 43 and passed through conduit 51 to condenser 52. Condenser 52 is maintained at a temperature below about 100° C. to condense substantially all of the halocarbon oils. Condensate is passed from condenser 52 through conduit 53 to accumulator 54. Condensate from accumulator 54 comprising relatively low boiling halocarbon oils is removed from accumulator 54 through conduit 56. A portion of this condensate may be recycled to the upper portion of fractionator 43, by means not shown, as a reflux, or may be recycled to cracking chamber 41, if desired, by means not shown. Uncondensed vapors comprising monomer, hydrogen fluoride and hydrogen chloride are removed from accumulator 54 through conduit 57 and passed to absorber 58, which contains sodium fluoride. In absorber 58 hydrogen fluoride is absorbed. The remainder of the gaseous material comprising monomer and hydrogen chloride is passed from absorber 58 through conduit 59 to absorber 61, which contains caustic such as solid sodium hydroxide. In absorber 61 hydrogen chloride is removed from the gases. The remaining gases comprising monomer and any accompanying gaseous halocarbons are removed from absorber 61 through conduit 62 by means of a partial vacuum, and may be recycled to reactor 14, if desired.

The fluorocarbon oil fractions in conduit 49 and/or 56 and/or any intermediate fractions withdrawn from fractionator 43 by means not shown are now subjected to a stabilization treatment comprising the successive steps of chlorination and fluorination to improve the physical and chemical characteristics of the oil. The various oil fractions recovered from fractionator 43 may be stabilized separately or may be combined for stabilization in any manner, as desired. According to the present description, the oil fractions from conduits 49 and 56 are combined for treatment and are passed through conduit 67 to a chlorinator 68. Chlorinator 68 comprises an elongated vertical tower having a plurality of longitudinally spaced heat exchangers 69, 71 and 72. The halocarbon oil fraction to be chlorinated is introduced into the upper portion of column 68 and the liquid oils pass downwardly through column 68 countercurrently to upward flowing free chlorine introduced into the lower portion of the tower by means of conduit 73. A temperature gradient is preferably maintained from top to bottom of column 68 by means of heat exchangers 69, 71 and 72. The overall temperature gradient of column 68 is usually between about 80 to 100° C. at the top to about 150 to 200° C. at the bottom. Preferably, the temperature varies from 100° C. at the top to 150° C. at the bottom. A uniform temperature may be imposed on tower 68, if desired, without departing from the scope of this invention. Unreacted chlorine and substituted hydrogen and hydrogen chloride are removed as vapors from the upper portion of column 68 through conduit 74. Chlorinated oils are removed as a liquid from the lower portion of column 68 through outlet conduit 76.

Chlorination of the halocarbon oils is usually effected in the presence of a catalyst or promoting agent. Such promoting agent comprises sunlight, ultra-violet light, ferric chloride, antimony pentachloride and phosphorous pentachloride. When employing a tower such as tower 68, it is preferred to utilize a solid packing comprising the promoting agent such as antimony pentachloride indicated by numeral 77 in the cross-sectioned area of tower 68. In batch chlorination procedures sunlight and ultra-violet light may be conveniently employed.

Any suitable pressure may be employed during the chlorination without departing from the scope of this invention. Generally, atmospheric pressure chlorinations are used; however, the use of pressures as high as 1000 pounds per square inch gage is contemplated. In general, the amount of chlorine varies between about 1 to 10 parts by weight per hundred parts by weight of halocarbon oils charged to column 68. The amount of chlorine employed will, however, depend upon the degree of unsaturation of halocarbon oils and the ease of replacement of the end groupings of the polymer. In this respect it has been found that polymerization of trifluorochloroethylene in an aqueous medium employing an inorganic peroxide, reduces the complexity of the end groups of the polymer and consequently increases the ease with which these end groupings may be replaced with chlorine. The organic peroxides, such as benzoyl peroxide, often result in end groupings which are relatively more difficult to replace with chlorine than those groupings associated with the inorganic peroxide promoters. For this reason the polymerization of the perhalocarbon oils in an aqueous medium in the presence of inorganic peroxide is preferred when the oil is to be stabilized with chlorine, particularly when chlorination is the only stabilization step utilized.

The chlorinated and partially stabilized oils are passed from tower 68 through conduit 76 to fluorinator 78. Fluorinator 78 also comprises an elongated vertical tower having a plurality of spaced heat exchangers 79, 81 and 82 along the length of the tower. The partially stabilized halocarbon oils are introduced through conduit 76 into the upper portion of column 78 and flow downwardly countercurrently to an upwardly flowing gas of chlorine trifluoride introduced into column 78 through inlet conduit 83 at the lower portion thereof. As in column 68 for chlorination, a temperature gradient is preferably maintained in fluorinator 78 by means of heat exchangers 79, 81 and 82. Fluorination is usually carried out at a top temperature of about 100 to 150 and at a bottom temperature of about 200 to 250 or 300° C. vapors comprising unreacted chlorine trifluoride, hydrogen chloride, hydrogenfluoride, etc. are removed from the upper portion of column 78 through outlet conduit 84. Substantially completely stabilized oils are removed as liquids from the lower portion of column 78 through conduit 86. The fluorination may be conducted in the presence of a suitable catalyst or promoting agent, such as cobaltic trifluoride. If preferred, the fluorination may be carried out solely in the presence of cobaltic trifluoride, manganese fluoride, cerium fluoride, or silver fluoride. Other conventional fluorinating agents may be employed without departing from the scope of this invention. Numeral 87 indicates a suitable packing material comprising the promoting agent or the fluorinating agent per se in column 78. As in the case of chlorination, any suitable pressure may be employed during fluorination and the amount of fluorine employed will depend upon the degree of saturation of the oils and the ease of removing end groupings from the halocarbon oils. In general, a considerable excess of fluorinating agent is employed during the fluorination. Fluorination may also be effected with anhydrous hydrofluoric acid in the presence of lead tetra acetate at a temperature of 50° C. to 200° C. at autogenous pressure. This type of fluorination results in a sufficiently stable halocarbon oil for most uses and is somewhat more economical than employing free fluorine or chlorine trifluoride for fluorination.

The vapors recovered from the chlorination and fluorination towers through conduit 74 and 84 respectively may be passed through suitable absorbers and caustic scrubbers to remove and recover the acidic compounds and the chlorine and fluorine, if desired. It may be desirable to pass these vapors containing fluorine and chlorine to cracking chamber 41 by means not shown and cracking the halocarbon oils in the presence of such vapors as previously described.

Substantially completely stabilized oils from column 78 are passed through conduit 86 to a stripper 88. Numeral 89 designates a heat exchange means for maintaining the desired temperature of the oils in the lower portion of stripper 88. With polytrifluorochloroethylene oils the stripping temperature at the bottom of stripper 88 is maintained between about 100 and 250° C. If desired, nitrogen or other inert gas may be bubbled through the liquid oils in stripper 88 to aid in stripping fluorine and chlorine and other impurities from the oil. The stripped vapors are removed from stripper 88 through conduit 92 and may be caustic washed or treated in any conventional manner to remove or render harmless obnoxious and dangerous impurities. The stripper oil is removed from stripper 88 through conduit 91 and may be subjected to further treatment, such as fractional distillation, to recover and separate desired fractions or compounds.

In some instances it may be unnecessary to subject the chlorinated fraction from tower 68 to fluorination. If fluorination is not necessary or desired, the halocarbon oils in conduit 76 may by-pass fluorinator 78 by means of conduit 93 and may thus be passed directly to stripper 88.

Example

Chlorination of a cracked polymer oil previous to fluorination was carried out as described below. Polymer oil, boiling in the range of about 200 to about 350° C. (3553 gms.) was chlorinated in the presence of light at 100–130° C. with continuous stirring in a three liter, three necked flask equipped with a stirrer, a gas inlet tube, thermometer, and a reflux condenser. The chlorine was added intermittently throughout the run. The oil was treated with chlorine for one hour while the temperature was increased from 100 to 120° C. and for an additional 1¼ hours at 120° C. An increase in weight of 87 gms. was observed. The oil was further treated with chlorine for 5 hours at 130° C. which resulted in a total decrease in weight of 157 gms. The oil had changed from very dark brown to a clear light straw color.

Fluorination of the chlorinated oil, 3704 gms., was conducted in a Monel metal reaction vessel equipped with a stirrer and was heated by means of an oil bath. Cobaltic fluoride, 500 gms., was added at a temperature of 35° C. and temperature increased to 117° C. over a period of three hours. At this point, another 500 gms. of cobaltic fluoride was added and the temperature increased to 202° C. in four hours and another charge of 500 gms. of cobaltic fluoride added. The temperature was gradually raised to 245° C. over a period of approximately seven hours. A final charge of 500 gms. of cobaltic fluoride was added at 245° C. but was only partially consumed. A total of 2000 gms. of cobaltic fluoride was added and it appeared that a little more than 1500 gms. was consumed.

The oil produced in this manner was stable to the standard permanganate test.

We claim:
1. A process for stabilizing a halocarbon oil prepared by cracking at a temperature between about 330° C. and about 600° C. a relatively high molecular weight polymer of trifluorochlorethylene having a maximum softening point not greater than 200° C. to produce a lower molecular weight oil and monomer and separating said oil from monomer, which comprises chlorinating at least a portion of the separated oil with free chlorine at a temperature between about 80° C. and about 200° C., subsequently fluorinating the chlorinated oil with chlorine trifluoride to substantially saturate said oil, and recovering a substantially saturated halocarbon oil as a product of the process.

2. The process of claim 1 in which said chlorinated oil is fluorinated with chlorine trifluoride at a temperature between about 100° C. and about 300° C. to substantially saturate said oil.

3. The process according to claim 1 in which said halocarbon oil is countercurrently contacted with said chlorine and a temperature is maintained during the initial portion of said chlorination within the lower portion of said temperature range and a temperature is maintained during the final portion of said chlorination within the upper portion of said temperature range.

4. The process of claim 1 in which said halocarbon oil is chlorinated at a pressure between atmospheric and about 1000 pounds per square inch gage with an amount of chlorine between about 1 to 10 per hundred parts by weight of halocarbon oil.

5. A process for stabilizing a halocarbon oil prepared by cracking at a temperature between about 330° C. and about 600° C. a relatively high molecular weight polymer of trifluorochloroethylene having a maximum softening point not greater than 200° C. to produce a lower molecular weight oil and monomer and separating said oil from monomer, which comprises chlorinating at least a portion of the separated oil with free chlorine at a temperature between about 80° C. and about 200° C., subsequently fluorinating the chlorinated oil with chlorine trifluoride at a temperature between about 100° C. and about 300° C. to substantially saturate said oil, stripping said oil with nitrogen of undesirable components acquired during halogenation and recovering a substantially saturated halocarbon oil as a product of the process.

ALBERT L. DITTMAN.
JOHN M. WRIGHTSON.

References Cited in the file of this patent

UNITED STATES PATENTS

| Number | Name | Date |
| --- | --- | --- |
| 1,961,622 | Nutting et al. | June 5, 1934 |
| 2,410,541 | Joyce | Nov. 5, 1946 |
| 2,411,159 | Hanford | Nov. 19, 1946 |
| 2,420,222 | Benning | May 6, 1947 |
| 2,436,069 | Joyce | Feb. 17, 1948 |
| 2,471,831 | McBee et al. | May 31, 1949 |
| 2,480,560 | Downing et al | Aug. 30, 1949 |
| 2,489,970 | McBee et al. | Nov. 29, 1949 |

OTHER REFERENCES

Ruff et al., Z. Anorg. Allgem. Chem., vol. 190, pp. 270–6 (1930).

Miller, Jour. Am. Chem. Soc., vol. 62, p. 344 (1940).

Booth et al. Chemical Reviews, vol. 41, pp. 421-2, 436-9 (1947).